United States Patent
Matsumoto et al.

(10) Patent No.: US 7,424,628 B2
(45) Date of Patent: Sep. 9, 2008

(54) SERIAL TYPE INTERFACE CIRCUIT, POWER SAVING METHOD THEREOF, AND DEVICE HAVING SERIAL INTERFACE

(75) Inventors: Kazunari Matsumoto, Kawasaki (JP); Hirohide Sugahara, Kawasaki (JP); Katsuhiko Takeuchi, Kawasaki (JP); Shinichi Utsunomiya, Kawasaki (JP); Sumie Matsubayashi, Kawasaki (JP); Nobuyuki Myouga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 652 days.

(21) Appl. No.: 10/977,112

(22) Filed: Oct. 29, 2004

(65) Prior Publication Data
US 2005/0169356 A1    Aug. 4, 2005

(30) Foreign Application Priority Data
Jan. 30, 2004   (JP)   .............................. 2004-022823

(51) Int. Cl.
*G06F 1/00*   (2006.01)
(52) U.S. Cl. ...................... 713/300; 713/500
(58) Field of Classification Search .................. 713/300
See application file for complete search history.

(56) References Cited

U.S. PATENT DOCUMENTS 7,294,970 B2 * 11/2007 Yang ........................... 315/158
2003/0231526 A1 * 12/2003 Watanabe et al. ...... 365/189.09

FOREIGN PATENT DOCUMENTS

| JP | 2001-117724 | 4/2001 |
| JP | 2001-229115 | 8/2001 |
| JP | 2002-51072 | 2/2002 |

OTHER PUBLICATIONS

Serial ATA: High Speed Serialized AT Attachment; Revision 1.0a; pp. 1-310; Jan. 7, 2003.

* cited by examiner

*Primary Examiner*—Rehana Perveen
*Assistant Examiner*—Mohammed H Rehman
(74) *Attorney, Agent, or Firm*—Greer, Burns & Crain, Ltd.

(57) ABSTRACT

A power saving of a serial interface circuit decreases the unnecessary power consumption of a serial interface circuit, while decreasing the return time and expanding the power saving range. Gates are disposed for stopping the clock supply to a digital portion of the interface circuit while maintaining operation of clock sources in the digital portions. Therefore a quick shift to and return from the power save mode by stopping and restarting clocks is implemented, which further decreases power consumption.

17 Claims, 11 Drawing Sheets

PRIOR ART

SERIAL TYPE INTERFACE CIRCUIT, POWER SAVING METHOD THEREOF, AND DEVICE HAVING SERIAL INTERFACE

CROSS-REFERENCE TO RELATED APPLICATIONS

This application is based upon and claims the benefit of priority from the prior Japanese Patent Application No. 2004-022823, filed on Jan. 30, 2004, the entire contents of which are incorporated herein by reference.

BACKGROUND OF THE INVENTION

1. Field of the Invention

The present invention relates to a serial type interface circuit for decreasing the power consumption of an interface circuit and a device when data is transferred between a host and the device via a high-speed serial interface, a power saving method thereof, and a device having such a serial interface.

2. Description of the Related Art

As the processing of microprocessors (MPU) improves, the improvement of the transfer speed between the host computer and a peripheral device (e.g. hard disk drive) is demanded. As such demand increases, a high-speed serial interface using a packet type protocol has been proposed.

The parallel interface transfers data in parallel via a plurality of data lines, so data on the plurality of signal lines must be synchronized, and interference and noise between the signal lines becomes a problem, which makes it difficult to increase the transfer speed.

A serial interface, on the other hand, transfers the data in serial via a single data line, so there is only a pair of signal lines, a timing shift does not occur, and stable high-speed transfer is possible. SATA (Serial AT Attachment), for example, is attracting attention as a serial interface which is a low voltage type, and has a several giga bps transfer speed.

Figure 8:
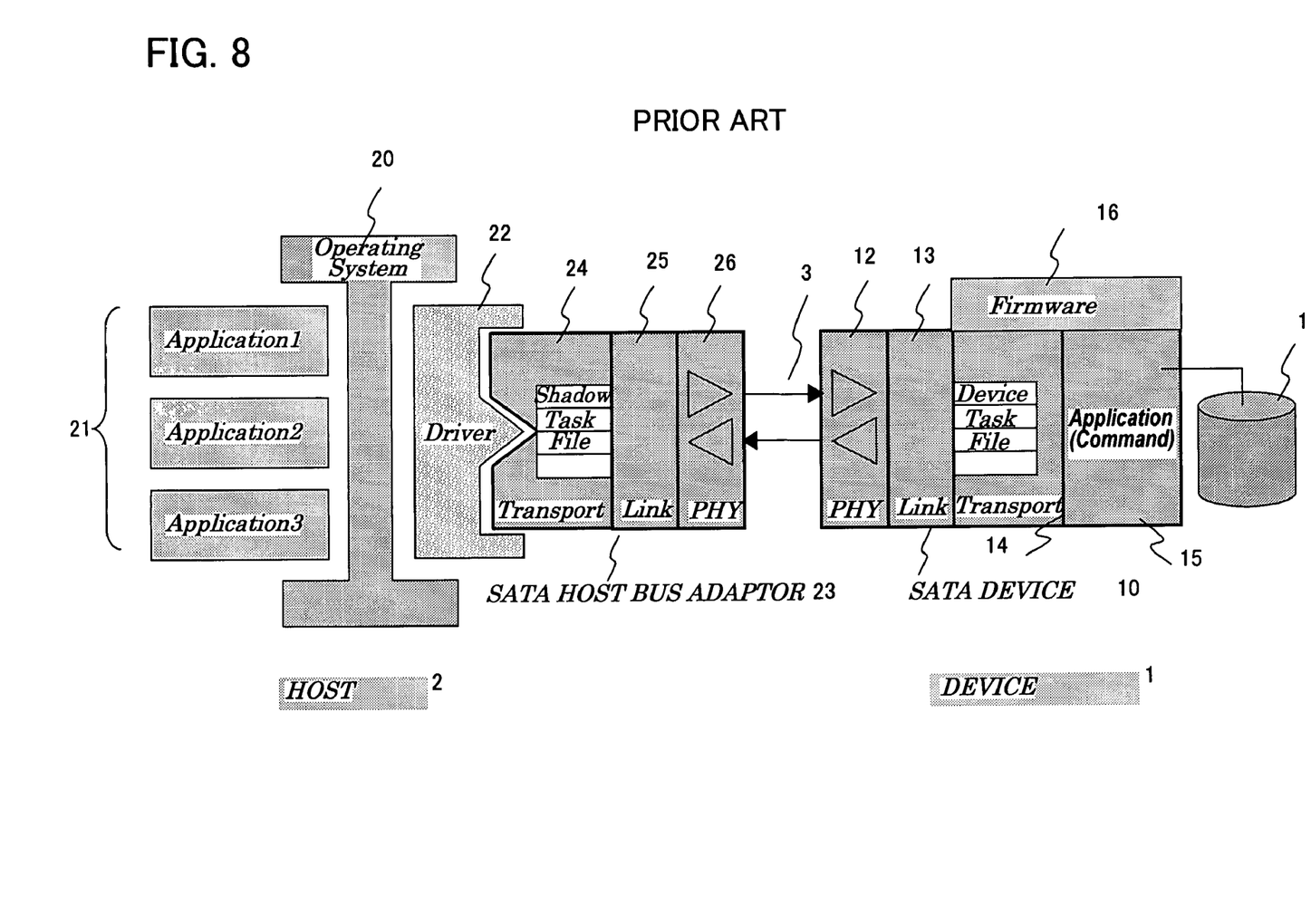
FIG. 8 is a block diagram depicting a conventional serial interface system.

FIG. 8 is a block diagram of a serial ATA system. The host 2 and the peripheral device 1 (hard disk drive in this case) are connected by the SATA interface 3.

The host 2 operates a plurality of application programs 21 based on the control of the operating system 20. The driver 22 drives the peripheral device 1 based on the control of the operating system 20. In this driver 22, the SATA host bus adapter 23 is disposed for the SATA interface 3.

The SATA host bus adapter 23 comprises a transport layer 24 for performing transfer control, a link layer 25 for performing frame transmission and reception control, and a physical layer 26 for performing physical control of the interface.

In the peripheral device 1, the SATA device 10 is disposed in the device (hard disk drive) 11 for SATA interface connection.

The SATA device 10 comprises a physical layer 12 for performing physical control of the interface, a link layer 13 for performing frame transmission/reception control, a transport layer 14 for performing transfer control, an application layer 15 for controlling the device, and a firmware 16 for controlling the transport layer 14 and the application layer 15 according to the status of the device 11.

For a system having such an interface, decreasing power consumption is demanded and a power save mode, to decrease power consumption when the peripheral device 1 is not used, is provided.

For example, if the host 2 recognizes that the peripheral device 1 is not used for a predetermined time, the host 2 issues the power save command to the device 1 so as to shift the device 1 to the power save mode, or the device 1 itself monitors commands and data from the host 2 and shifts to the power save mode when a command is not received from the host 2 for a predetermined time (e.g. refer to "Serial ATA: High-speed Serialized AT Attachment", Serial ATA Workshop Revision 1.0a, Jan. 7, 2003 issue).

By providing such a power save mode in the device 1, the power consumption of the device 1 can be decreased, and in particular, the power save mode is appropriate to apply to a device which requires low power consumption because of power capacity restrictions, such as a notebook personal computer and a portable terminal.

Figure 9:
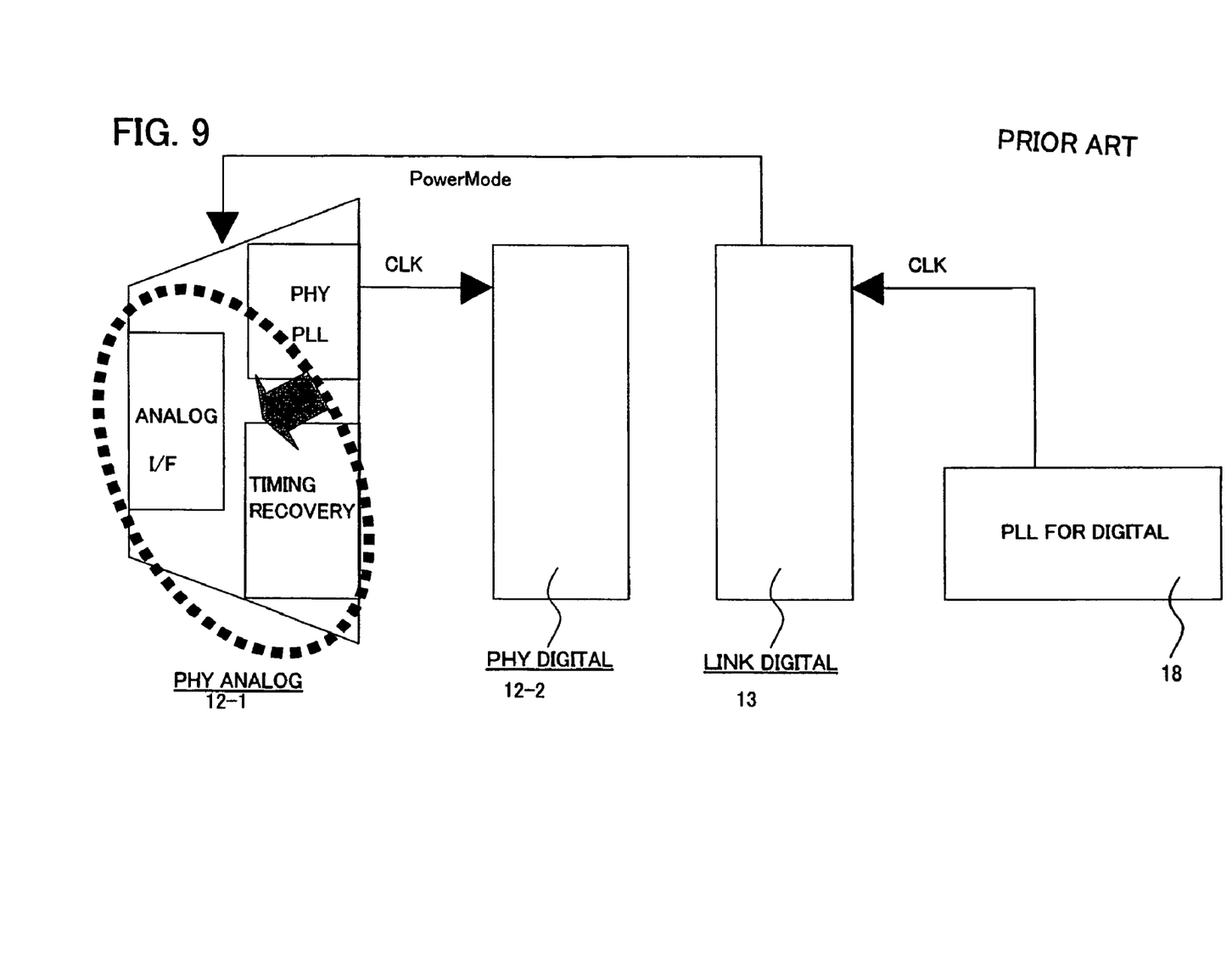
FIG. 9 is a diagram depicting a conventional power save operation.
Figure 10:
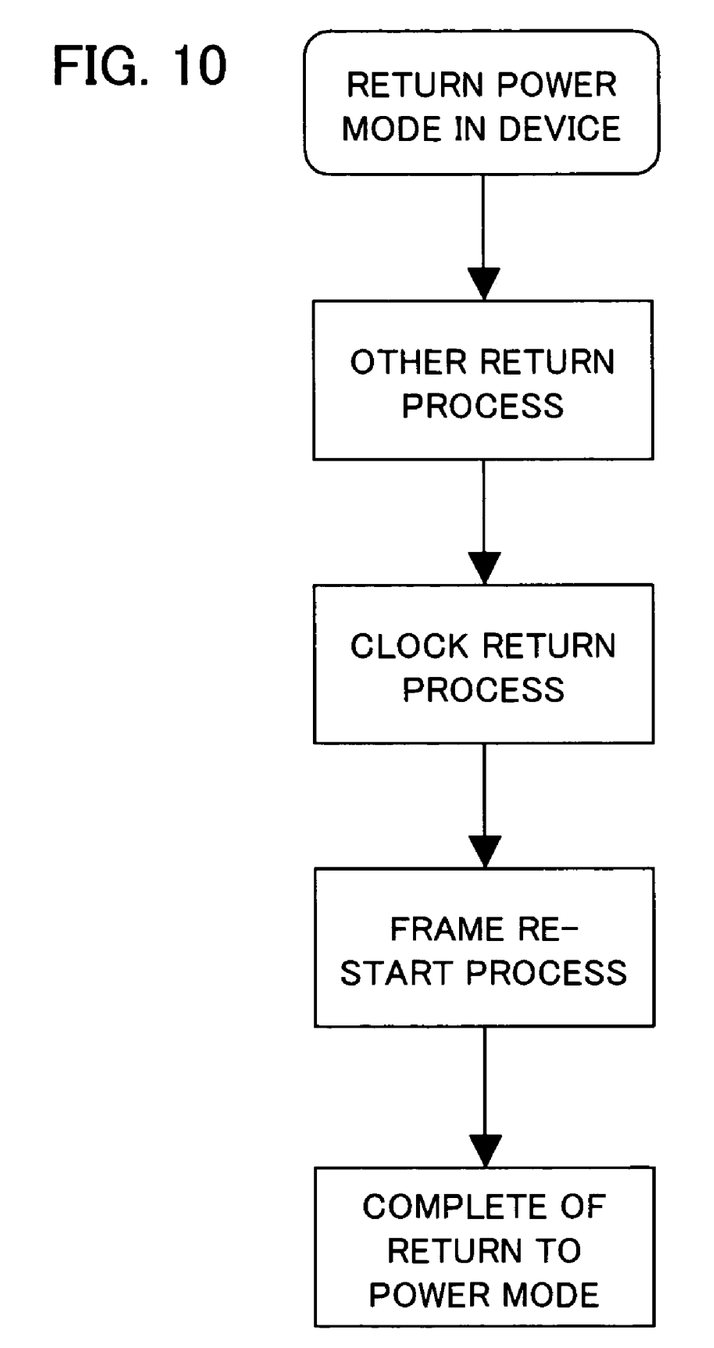
FIG. 10 is a flow chart depicting conventional return processing from power save.
Figure 11:
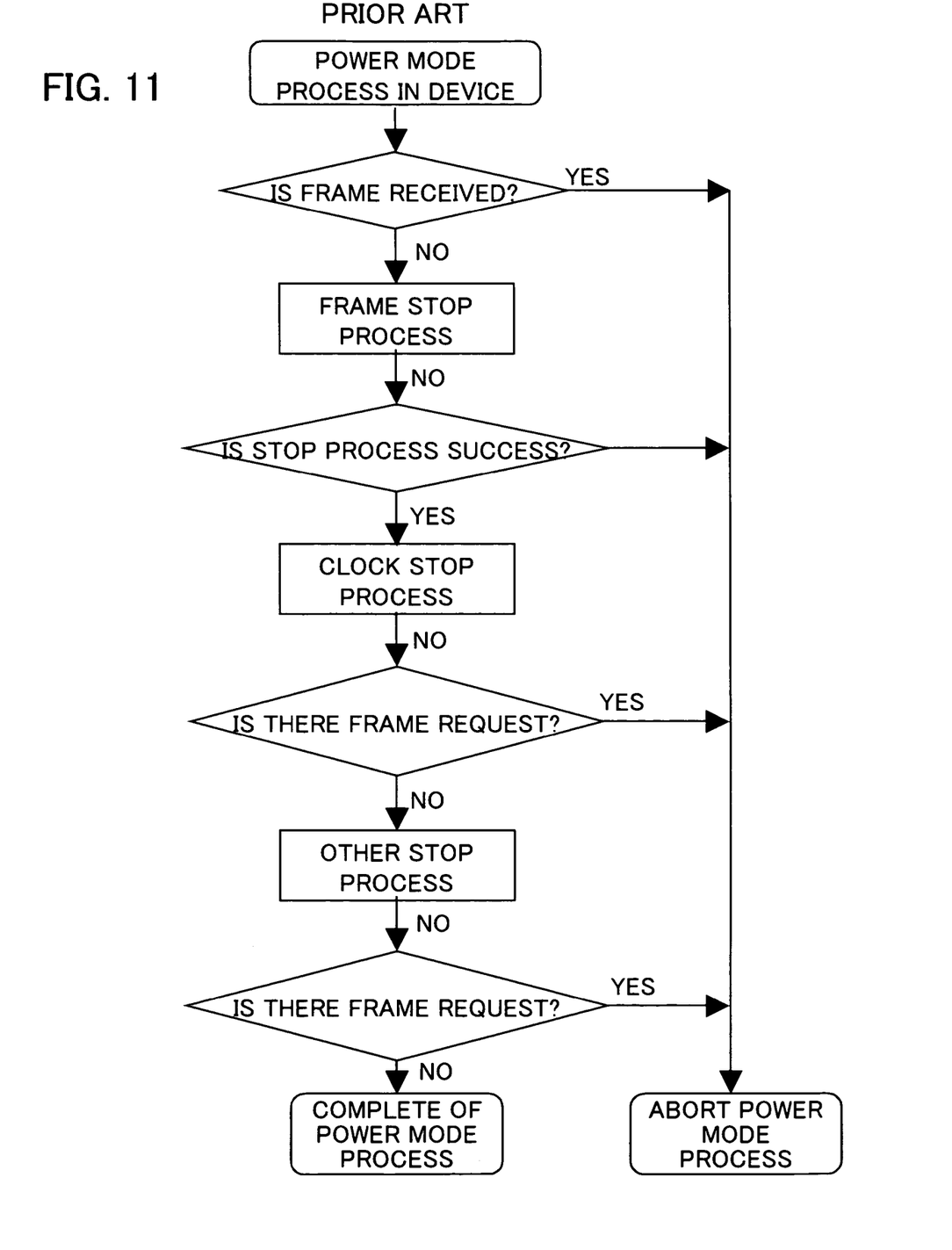
FIG. 11 is a flow chart depicting conventional entering processing into power save.

FIG. 9 is a diagram depicting the power save mode of a conventional interface, and FIG. 10 and FIG. 11 are diagrams depicting the power save mode inside a conventional device.

As FIG. 9 shows, the interface of the above mentioned SATA device 10 comprises a physical layer 12 and a link layer 13. The physical layer 12 further comprises an analog circuit 12-1 including an analog interface circuit, a timing recovery circuit, and a synchronization PLL circuit, and a digital circuit 12-2 which performs S-P (Serial-Parallel) conversion, P-S (Parallel-Serial) conversion, data extraction, and synchronization control. The digital circuit 12-2 operates with the clock of the analog circuit 12-1.

The link layer 13 has a link digital circuit for performing link establishment, frame reception, transfer, encoding, CRC check and frame flow control. The link digital circuit 13 operates with the clock of the digital PLL 18 of the SATA device 10.

In such an interface, conventionally the focus was to decrease the current of the analog portion 12-1 which consumes relatively high power, while the power consumption of the digital portion was not intentionally controlled.

In the power save mode inside the device 10, on the other hand, internal digital clock operation is stopped and returned. This control is completely performed by firmware 16 of the CPU. The firmware during a power save takes enormous time if complicated control is involved, since the CPU performance is restricted during the power save.

In other words, as FIG. 10 and FIG. 11 show, in the SATA device 10, the firmware 16 must perform complicated procedures to confirm the hardware status to prevent an unexpected stoppage of the clock during frame reception. This is the same for returning.

For example, in the case of the power save mode entering processing, it is checked whether frames from host 2 are being received, whether frame stop processing was success, and whether a frame request was received, as shown in FIG. 11, then the frame stop processing, clock stop processing and other stop processings are performed, and power save mode processing is completed.

In the return processing from the power save mode, as shown in FIG. 10, return processing such as initialization is performed, then clock return processing is performed, frame restart processing is subsequently performed, and then return processing is completed.

In the power save mode of a conventional interface, the return time of the analog circuit 12-1 tends to increase as the miniaturization of semiconductor technology advances. To improve performance, however, it is necessary that the return time is short, and if parts which power is cut are increased, then it is difficult to keep to the return time standard (e.g. two types in the case of Serial ATA, Slumber=10 ms, Partial=10 μs), so the parts to cut power are restricted. This makes it difficult to sufficiently suppress power consumption.

Also as the digital portion 12-2 becomes complicated and there is a relative increase in power consumption, this increase in power consumption can no longer be ignored. If the clock of the digital portion is stopped, however, the above mentioned return time standard cannot be kept, which makes to difficult to implement power saving of the digital portion.

Also in the case of the internal power saving of a conventional device, frame type protocol is normally used for the serial type interface, but an unexpected clock stoppage during frame reception is avoided, and as mentioned above, the firmware 16 requires a complicated procedure to confirm the hardware status, which takes enormous time. This is the same for the returning.

The time required for entering and returning from power saving mode influences the performance of the entire system, so decreasing this entering and return time requires dropping power consumption without dropping performance. If the return time is decreased, it difficult to suppress power consumption as much as desired, and performance decreases in power save mode. Therefore conventional devices are not appropriate for an application where a further decrease in power consumption is critical, and where performance is also demanded (e.g. mobile equipment).

SUMMARY OF THE INVENTION

With the foregoing in view, it is an object of the present invention to provide a serial type interface circuit for decreasing power consumption in the power save mode while decreasing the return time from power save mode, the power save method thereof, and a device having the serial interface thereof.

It is another object of the present invention to provide a serial type interface circuit for preventing a drop in device performance in the power save mode while decreasing the entering and return time of power save mode, the power save method thereof, and a device having the serial interface thereof.

It is still another object of the present invention to provide a serial interface circuit for decreasing power consumption in power save mode while decreasing the entering and return time of power save mode by adding a simple circuit, the power save method thereof, and a device having the serial interface thereof.

To achieve these objects, the interface circuit for transmitting/receiving data via a serial interface, according to the present invention, has an analog-circuit connected to a serial line for the analog processing transmission/reception signals of the serial line, a digital circuit connected to the analog circuit for digital-processing the received signals from the analog circuit and the transmission signals to the analog circuit according to clocks, a clock generation circuit for supplying the clocks to the digital circuit, and a gate circuit for supplying and stopping the clocks of the clock generation circuit to the digital circuit. And power of the analog circuit is cut and the gate circuit is controlled to be in a clock supply stop status according to a power save instruction.

The power save method for an interface circuit for transmitting/receiving data via a serial interface, according to the present invention, has a step of controlling a gate circuit, that supplies and stops clocks of a clock generation circuit to a digital circuit, to be in the clock supply stop status according to a power save instruction, in the interface circuit has an analog circuit connected to a serial line for analog-processing transmission/reception signals on the serial line, and the digital circuit connected to the analog circuit for digital-processing the received signals from the analog circuit and the transmission signals to the analog circuit according to clocks, and a step of controlling the gate circuit to be in the clock supply status according to a return instruction.

The device according to the present invention is a device for transmitting/receiving data with a host via a serial interface, has a serial interface circuit and a processing circuit connected to the serial interface circuit for transmitting/receiving data with a host. And the serial interface circuit has an analog circuit connected to a serial line for analog-processing the transmission/reception signals of the serial line, a digital circuit connected to the analog circuit for digital-processing the received signals from the analog circuit and the transmission signals to the analog circuit according to clocks, a clock generation circuit for supplying the clocks to the digital circuit, and a gate circuit for supplying and stopping the clocks of the clock generation circuit to the digital circuit, and power of the analog circuit is cut and the gate circuit is controlled to be in a clock supply stop status according to a power save instruction.

In the present invention, it is preferable that the analog circuit constitutes a part of a physical layer, and the digital circuit has a first digital circuit constituting the other part of the physical layer and a second digital circuit constituting a link layer that performs link control.

In the present invention, it is preferable that the first digital circuit operates with clocks from a first clock source of the analog circuit via a first gate circuit, and the second digital circuit operates with clocks from a second clock source via a second gate circuit, and controls the first and second gate circuits to be in the clock supply stop status according to a power save instruction.

In the present invention, it is preferable to further has a clock stop circuit that monitors the reception status in the interface, and controls the gate circuit to be in the clock supply stop status when frames are not being received from the interface, according to the power save instruction.

In the present invention, it is preferable to further has a clock return circuit that returns the gate circuit to the clock supply status according to a frame transmission request from the interface.

In the present invention, it is preferable that the digital circuit cuts the power of the analog circuit and controls the gate circuit to be in the clock supply stop status, according to a power save instruction received from the interface.

In the present invention, it is preferable that the analog circuit has a driver to the interface, a receiver from the interface, a detection circuit for detecting a burst signal of the interface, and a clock generation source for generating clocks synchronizing with a signal of the interface, and the digital circuit returns the gate circuit to the clock supply status according to a frame transmission request that the detection circuit detected from the burst signal.

In the power save mode of the present invention, not only decreasing the current of the analog portion of the interface circuit, but also the clock operation alone is stopped while maintaining operation of the clock source in the digital portion, so a quick shift to and return from the power save mode by stopping/restarting clocks is implemented, which can further decrease power consumption.

In the serial type interface which uses a frame type protocol, an unexpected stoppage of clocks during frame reception is avoided and the time until a clock stop is decreased, since a hardware-based clock stop circuit is provided. The return time as well can be decreased since a hardware-based clock return circuit for a frame transmission request from the host side is provided.

BRIEF DESCRIPTION OF THE DRAWINGS

FIG. 6 is a diagram depicting the operation of the sequence when the host/device in FIG. 1 is ON;

DESCRIPTION OF THE PREFERRED EMBODIMENTS

Embodiments of the present invention will now be described in the sequence of the serial interface type device, SATA core logic circuit, power save entering/returning operation, clock supply stop control and other embodiments, but the present invention is not limited to these embodiments.

[Serial Interface Type Device]

Figure 1:
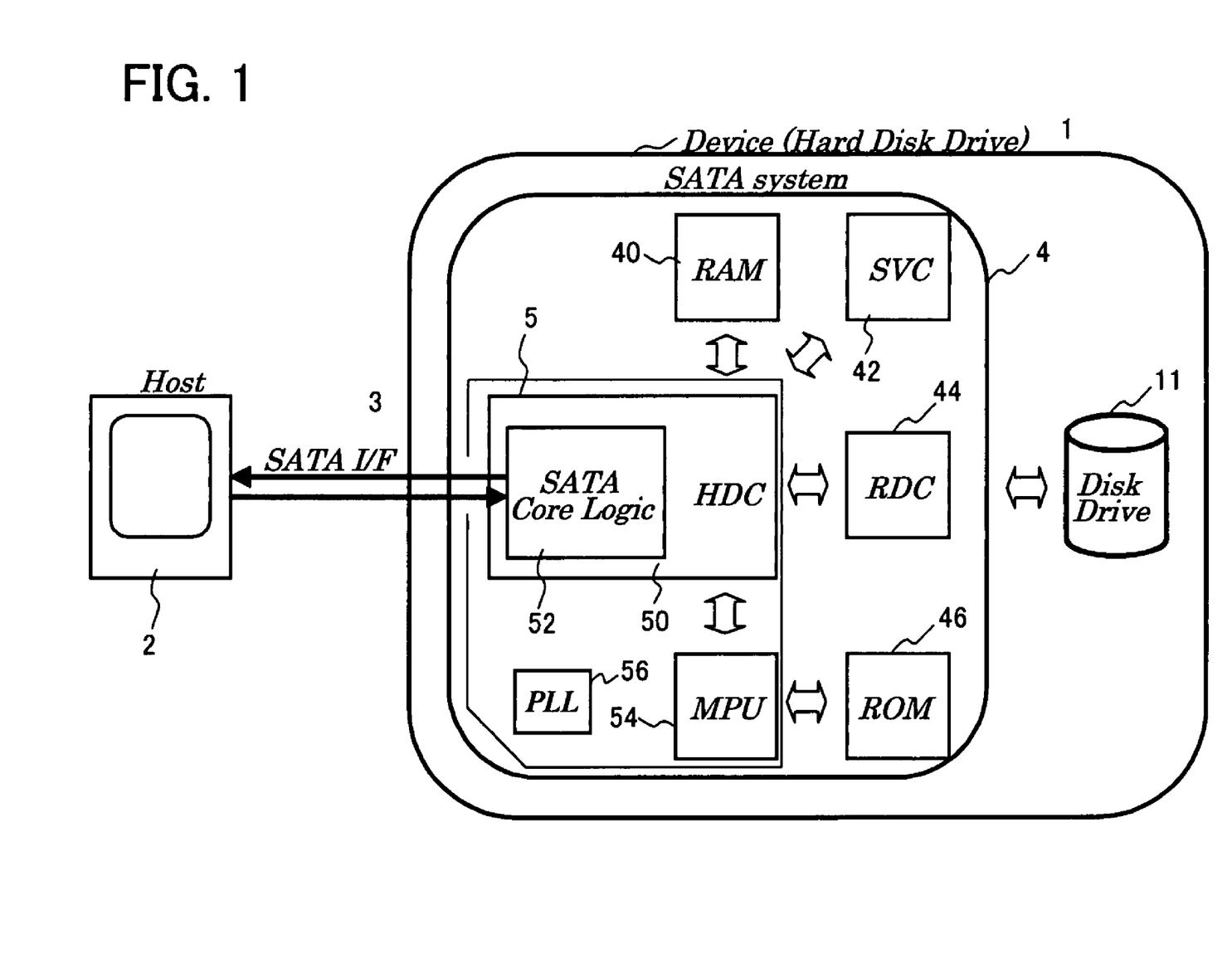
FIG. 1 is a block diagram depicting the serial interface system according to an embodiment of the present invention.

FIG. 1 is a block diagram depicting an embodiment of the serial interface type device of the present invention, and a hard disk drive is shown as an example of the device.

As FIG. 1 shows, the hard disk drive 1 is connected to the host (computer, such as an MPU) 2 via the SATA (Serial AT Attachment) interface 3. The hard disk drive 1 has a control block (SATA system) 4 and a disk drive mechanism 11. The disk drive mechanism 11 has a magnetic disk, a spindle motor for rotating the magnetic disk, an arm having a magnetic head, a VCM (Voice Coil Motor) for driving the arm and a read/write amplifier.

The SATA system 4 is for controlling the disk drive mechanism 11. The SATA system 4 has a hard disk controller 50, MPU (Microprocessor) 54, clock generation circuit (PLL) 56, RAM (Random Access Memory) 40 for temporarily storing read data/write data, a servo-controller 42 for controlling the spindle motor and VCM, a read channel 44 for performing read/write control of the magnetic head, and a ROM (Read Only Memory) 46 for storing programs for operation of the MPU 54.

The MPU 54 receives commands from the hard disk controller 50, executes the firmware stored in the ROM 46, and controls the servo-controller 42 and read channel 44 via the hard disk controller 50.

The clock generation circuit 56 supplies clocks required for each circuit in the SATA system 4. In the hard disk controller 50, the SATA core logic circuit 52 for the SATA interface (to be described in FIG. 2 to FIG. 4) is disposed.

Here the hard disk controller 50, MPU 54 and PLL 56 are integrated into one chip 5.

[SATA Core Logic Circuit]

Figure 2:
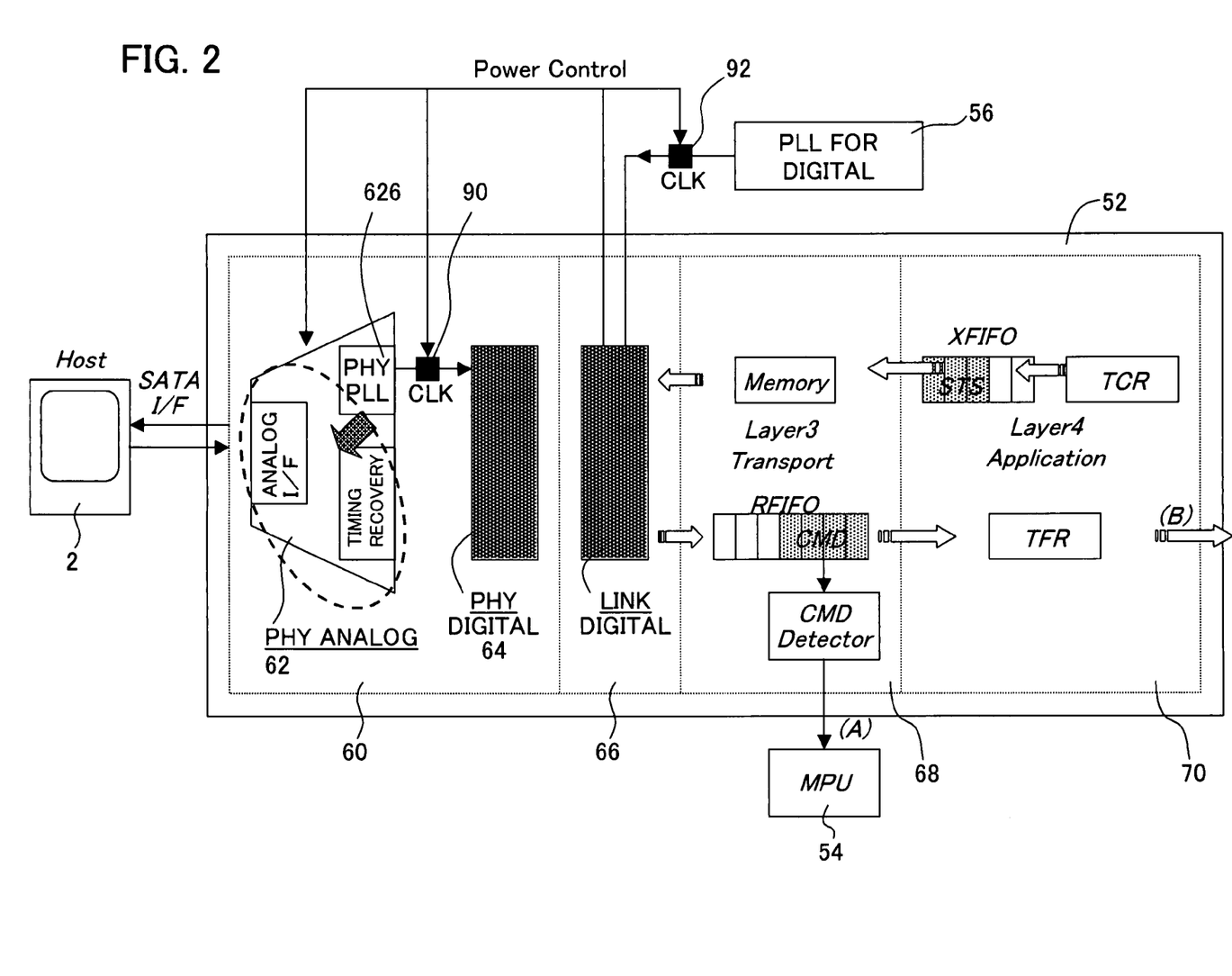
FIG. 2 is a block diagram depicting the serial interface circuit in FIG. 1.
Figure 3:
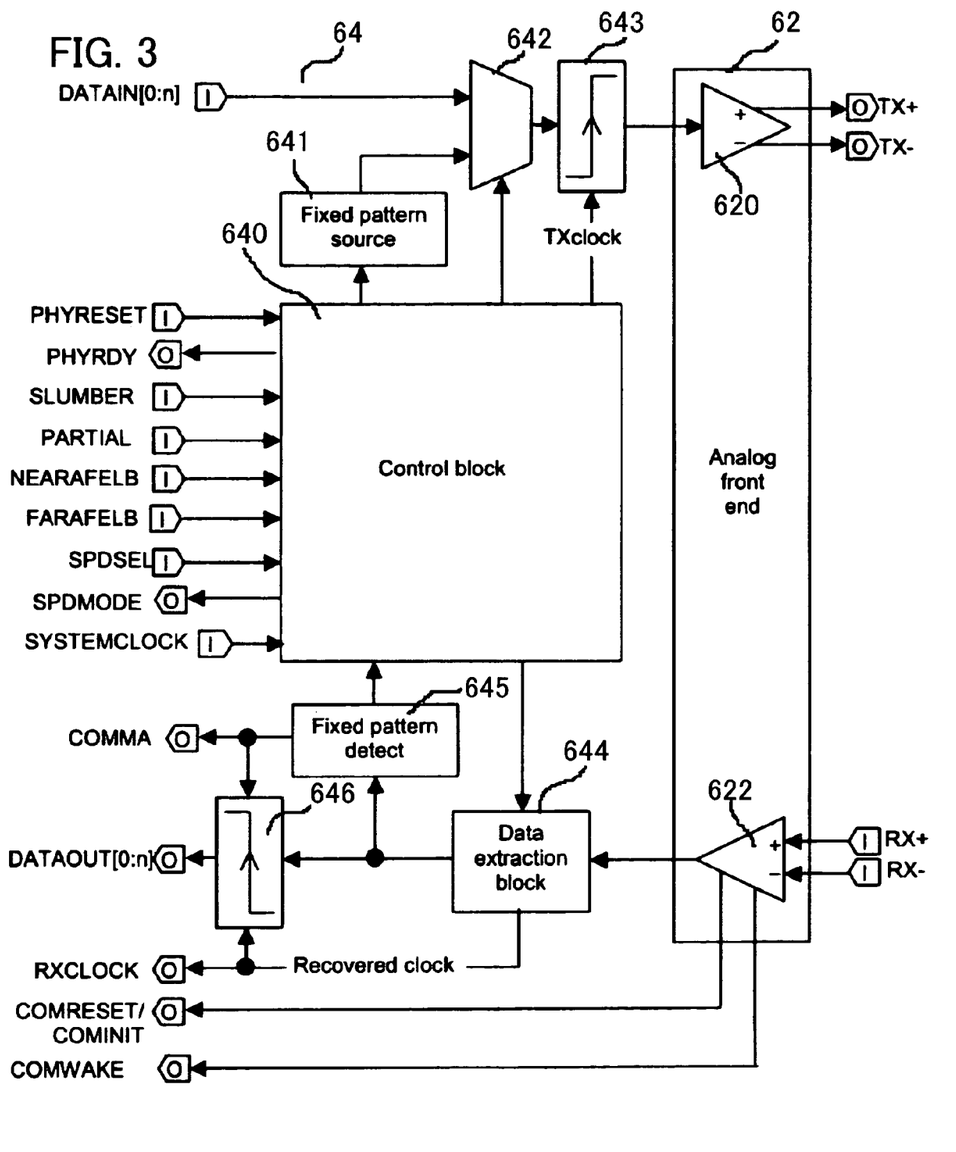
FIG. 3 is a block diagram depicting the physical layer and the link layer in FIG. 2.
Figure 4:
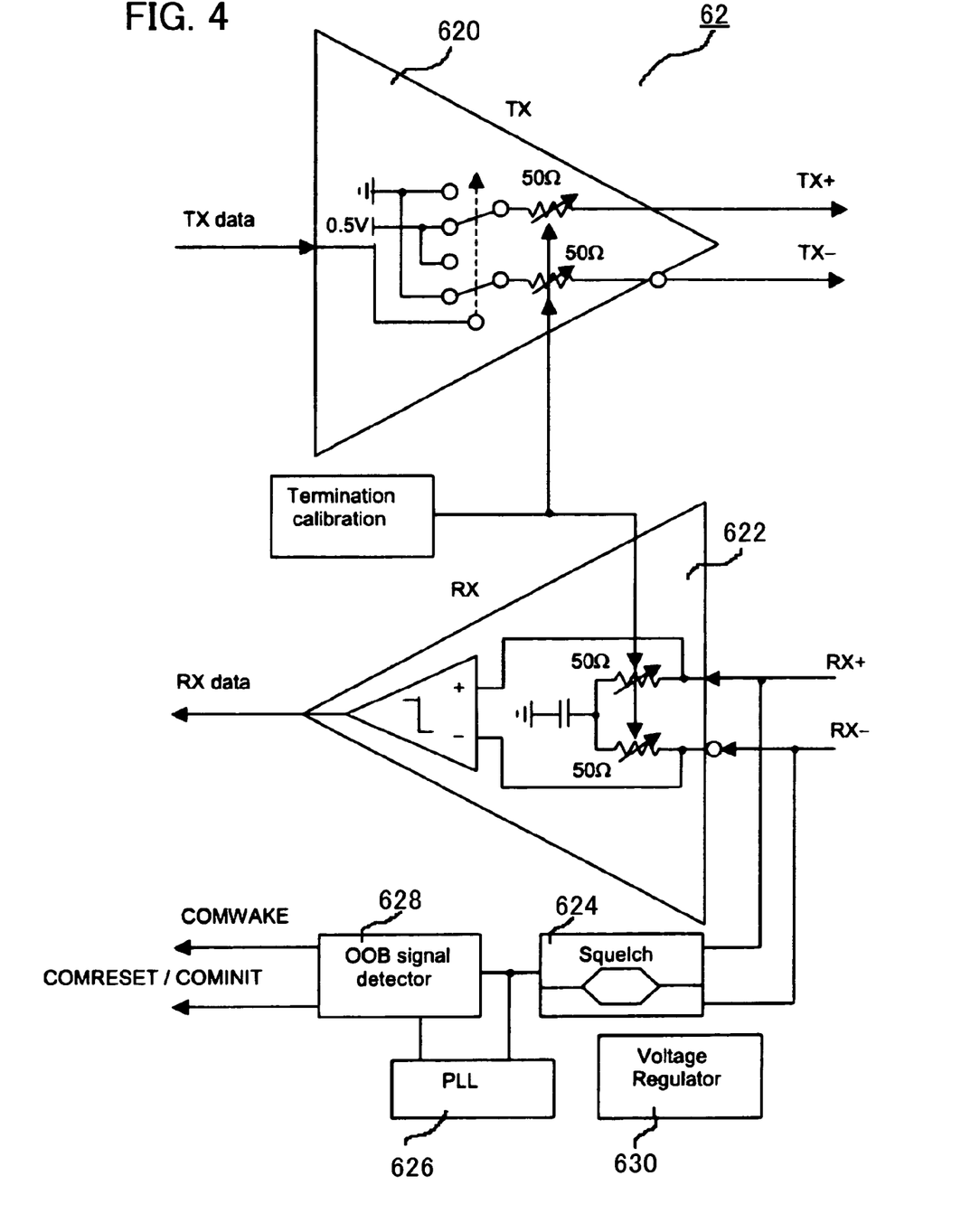
FIG. 4 is a block diagram depicting the analog physical layer in FIG. 3.

FIG. 2 is a block diagram of the SATA core logic circuit 52 in FIG. 1, FIG. 3 is a circuit diagram of the physical layer in FIG. 2, and FIG. 4 is a circuit diagram of the physical analog circuit in FIG. 3.

As FIG. 2 shows, the SATA core logic circuit 52 has a physical layer 60 for performing physical control of the interface, a link layer 66 for performing frame transmission/reception control, a transport layer 68 for performing transfer control, and an application layer 70 for performing device control.

The physical layer 60 has an analog circuit 62 and a digital circuit 64. FIG. 3 shows an example of the analog circuit 62 and the digital circuit 64. As FIG. 3 shows, the analog circuit 62 is called an analog front end block, and basically has a driver 620 and a receiver 622.

In more detail, the analog front end block 62 has a driver 620 for converting the transmission data TX data into differential signals TX+ and TX− and outputting them to the SATA interface, and a receiver 622 for converting the differential signals RX+ and RX− from the SATA interface into the receive data RX data and outputting it as shown in FIG. 4.

The block 62 further has a squelch circuit 624 for limiting the differential signals RX+ and RX− from the SATA interface so that detection of the common mode signal can be appropriately executed, an OOB (Out Of Band) signal detection circuit 628 for decoding the OOB signal from the input signal, a PLL circuit 626 for synchronizing the internal clock so that the input data stream can be appropriately decoded, and a voltage regulator 630 for adjusting the internal voltage.

The OOB signal is, for example, a starting signal COMWAKE, a reset signal COMRESET and an initialization signal COMINIT.

In FIG. 3, the physical digital circuit 64 has a control block 640 for controlling the general functions of the physical layer, a fixed pattern generator 641 for generating fixed patterns for aligning signal arrays, a selection circuit 642 for selecting either data DATA or a fixed pattern, a binarization circuit 643 for adjusting the frequency of the serial stream to be transmitted by the transmission reference clock.

The digital circuit 64 further has a data extraction circuit 644 for separating clock and data from the input signals, fixed pattern detector 645 for detecting a fixed pattern for array alignment from the data of the data extraction circuit 644, and a data synchronization circuit 646 for binarizing the separated data according to the detected fixed pattern and the extracted regeneration clock RXCLOCK.

This digital circuit 62 operates by the clock of the PLL circuit 626 shown in FIG. 4. "SLUMBER" to be input to the control block 640 is for setting the physical layer to the slumber power management status, and "PARTIAL" is for setting the physical layer to the partial power management status.

Both are signals for controlling the device to be the power save mode, but in the slumber power management status, 10 ms of return time is provided to return after receiving the starting signal COMWAKE, and in the partial power management status, 10 μs of return time is provided to return after receiving the starting signal COMWAKE.

In FIG. 2, the link digital circuit 66 establishes a link with the host 2 according to a frame transfer request from the transport layer 68, attaches a frame envelope (e.g. SOF, CRC, EOF), which is described later in FIG. 5, around the data from the transport layer 68, calculates CRC (Cyclic Redundancy Code) of a 32-bit Dword (data) received from the transport layer 68, assembles the frame, and sends it.

In the same way, when data is received from the physical layer 60, the link digital circuit 66 removes the frame envelope (e.g. SOF, CRC, EOF), which will be described later in FIG. 5, around the data, calculates CRC (Cyclic Redundancy Code) of 32-bit data (hereafter Dword), checks the CRC and transfers the data. Also the link digital circuit 66 controls the frame flow.

The transport layer 68 receives a request to construct a frame information structure (FIS) from the higher layer (application layer 70), and constructs a frame information structure. In the same way, when the frame information structure is received from the link layer 66, the transport layer 68 distributes the content of the frame information structure according to the type of the frame information structure. For example, if the type of the frame information configuration is a command, this content is distributed to the command detection circuit, and then is transferred to the MPU 54.

The application layer 70 sets the data (STS) of the firmware, being set in the register TCR (Task Control Register) for command processing and response, to XFIFO, transmits it to the transport layer 68, and loads the content of RFIFO in the transport layer 68 to TFR (Task File Register), and notifies this to the firmware.

As FIG. 2 shows, a glitch-less clock gate 90 is disposed between the PLL circuit 626 of the physical analog circuit 62 and the physical digital circuit 64. In the same way, the clock gate (glitch-less) 92 is disposed between the digital PLL 56 and the link digital circuit 66.

In the power save mode, not only current in the analog portion is saved, but also the clock supply to the digital portion is stopped by the gates 90 and 92 while to the PLLs 626 and 56 are operating continuously.

In other words, the power save mode signals (PMPEQ_P, PMREQ_S) of the interface, which are defined by primitives from the host 2, are recognized by the hardware (the frame reception state machine of the link layer 66), or the firmware of the MPU 54 monitors the frame reception status.

By this result, the hardware signal indicating the power save status is sent to the physical analog circuit 62, and to both of the clock gates 90 and 92 via the link digital circuit 66, so as to stop supplying clocks and cut power for the analog circuit 62 simultaneously. By stopping the supply of these clocks, both digital circuits 64 and 66 stop operation, which further decreases power consumption.

The power control signal is synchronized with the clock signal so that glitch will not be generated to clocks at stoppage. This prevents a malfunction of the digital circuits 64 and 66.

When returning from power save mode as well, the starting signal COMWAKE, indicating the power mode status from the host 2, is detected, and the hardware signal indicating the return from the power save mode is sent to the physical analog circuit 62 and both of the clock gates 90 and 92 via the link digital circuit 66 at the same time with release of the hardware signal, so as to restart the supply of clocks and to return power supply to the analog circuit 62 simultaneously.

In this case as well, restart is synchronized with the clock signal so that glitch will not be generated to the clocks. Since the PLLs 56 and 626, for generating clocks, are in continuous operation, the time required for restart for the digital circuits 64 and 66 is negligibly short (100 ns or less).

In this way, the clock supply to the digital circuit is stopped in the power save mode while continuously operating the clock source, so the power saving range can be expanded while decreasing the return time, which further decreases the power consumption.

If the total number of gates of the SATA core logic circuit 52 is 96K gates, for example, the number of gates of the physical digital circuit 64 and the link digital circuit 66 is about 52K gates, so compared with the prior art which does not stop the clock supply in partial operation, about 50% of power consumption can be decreased.

[Power Save Entering/returning Operation]

Now the power save entering/returning operation will be described with reference to FIG. 5 and FIG. 6. FIG. 5 shows a configuration example of the message of an SATA transmission sequence, and FIG. 6 is a diagram depicting the starting sequence of the host 2 and the device 1.

Figure 5:
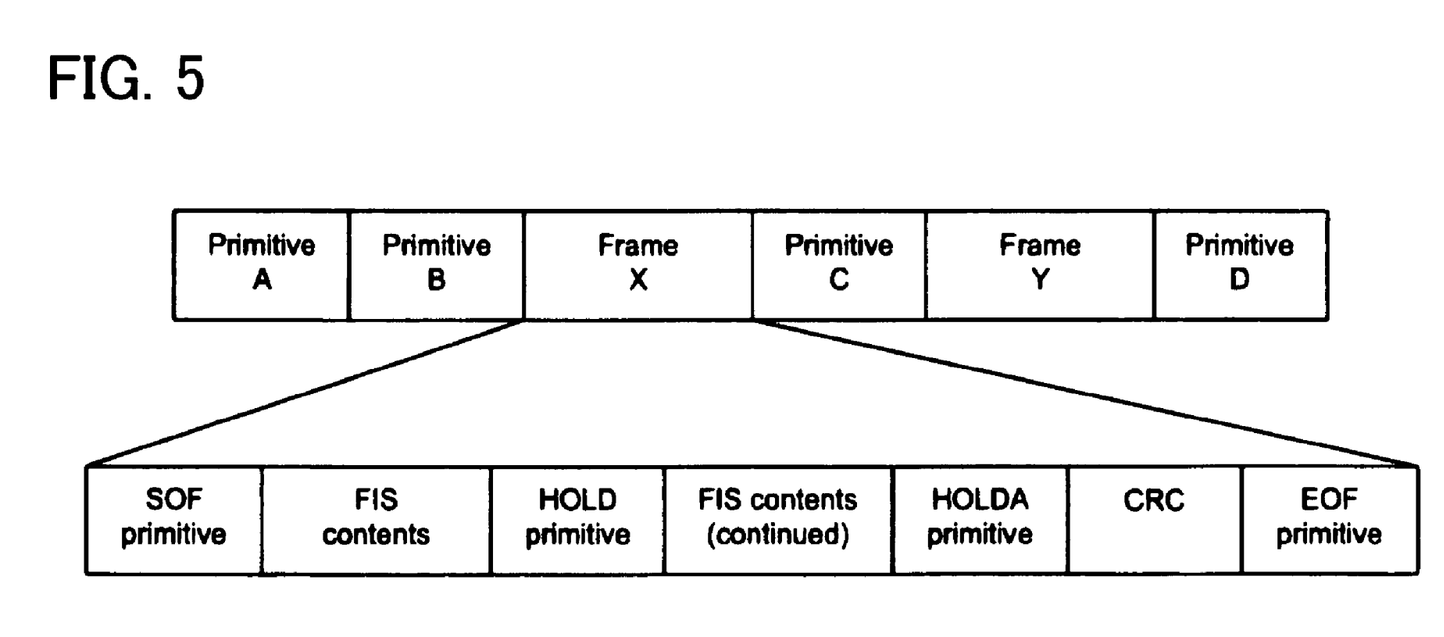
FIG. 5 is a diagram depicting the message format in FIG. 1.
Figure 6:
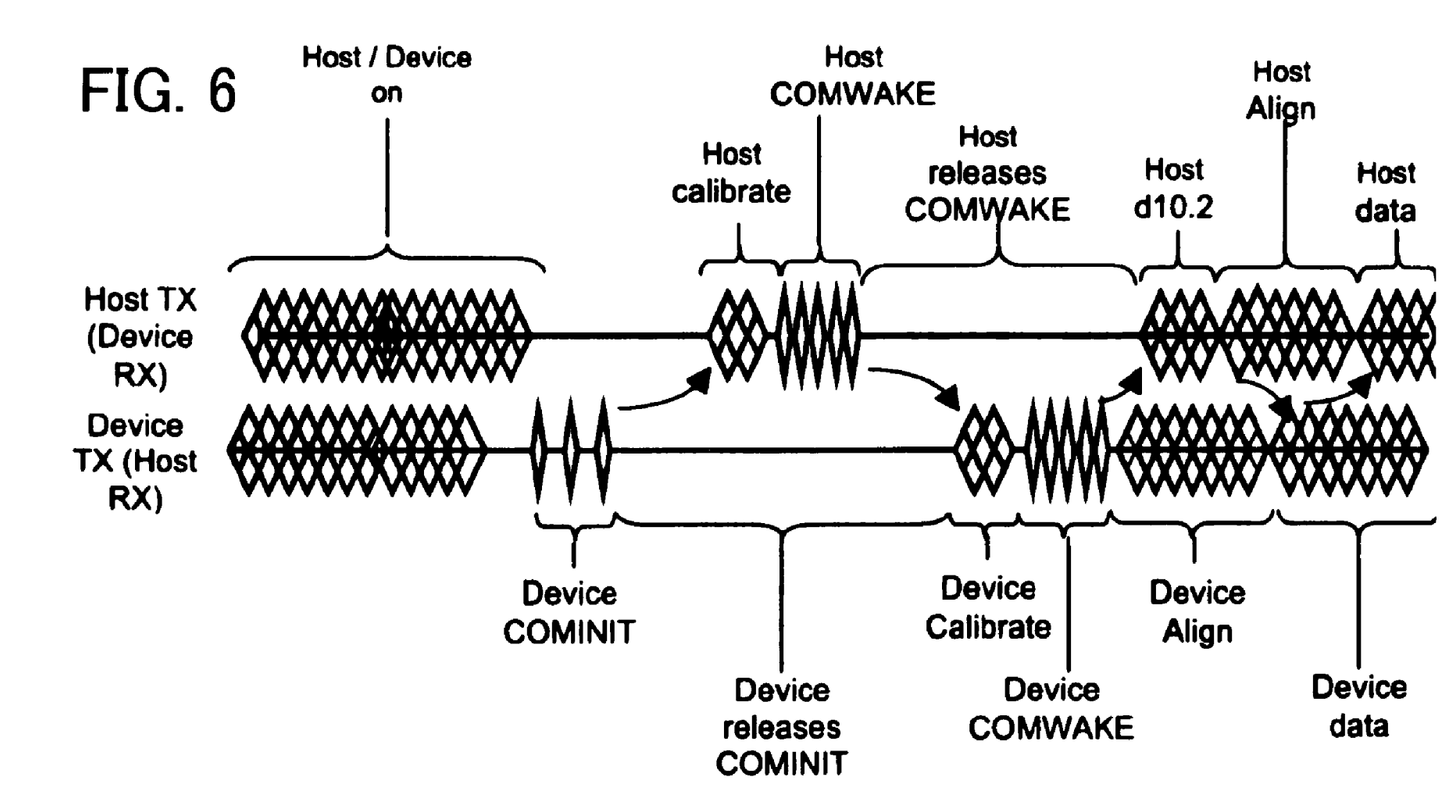

As FIG. 5 shows, the message comprises primitives and frames. A frame further comprises many Dwords. A frame normally starts with an SOF (Start Of Frame) primitive, then continues the user payload called an FIS (Frame information Structure) contents, and ends with CRC and EOF (End of Frame). If the FIS contents continues, some flow control primitives, such as a HOLD primitive and HOLDA primitive, are allowed between SOF and EOF in order to adjust the speed of the data flow.

The control characters that can be defined by the primitives are PMREQ_P (Power Management Request to Partial) and PMREQ_S (Power Management Request to Slumber), which are both power save mode entry commands.

The power save mode signals (PMREQ_P, PMREQ_S) of the interface, which are defined by primitives from the host 2, are recognized by the hardware (frame reception state machine of the link layer 66), or the firmware of the MPU 54 monitors the frame reception status.

Depending on this result, the hardware signal indicating the power save status is sent to the physical analog circuit 62 and both of the clock gates 90 and 92 via the link digital circuit 66, so as to stop the supply of clocks and to cut the power of the analog circuit 62 simultaneously. By stopping the supply of these clocks, both digital circuits 64 and 66 stop operation, which further decreases power consumption.

This power control signal is synchronized with the clock signal so that glitch will not be generated to the clocks at stoppage. This prevents a malfunction of the digital circuits 64 and 66.

FIG. 6 shows the on-sequence of the host/device, where the initialization signal Device COMINIT is issued from the device 1 to the host 2, and the host 2 performs calibration, then issues the burst signal type starting signal COMWAKE to the device 1. In the device 1, the above mentioned OOB signal detector 628 detects the starting signal COMWAKE indicating the power mode status from the host 2, sends the hardware signal indicating starting to the physical analog circuit 62 and both of the clock gates 90 and 92 via the link digital circuit 66 at the same time with the release of the hardware signal, so as to restart the supply of the clocks and to return the supply of the power of the analog circuit 62 simultaneously.

In the same way, if the firmware executed by the MPU 54 monitors the frame reception status and does not receive frames for a predetermined time, the power save mode signal, Slumber or Partial, is issued according to the time, and the clock is stopped. The starting signal COMWAKE may be issued from the MPU 54 of the device 1 to execute the return operation.

[Another Clock Supply Stop Control]

Figure 7:
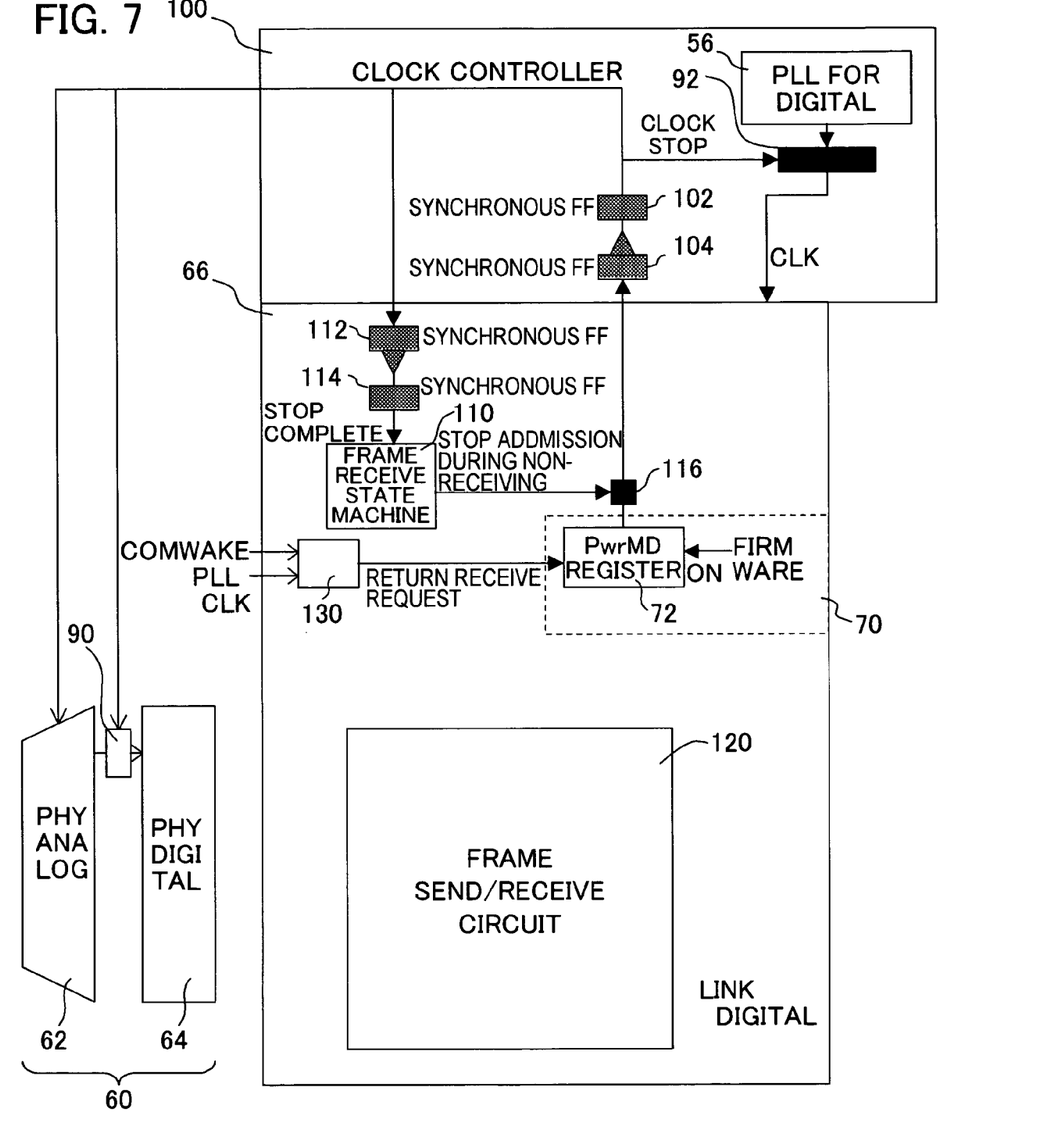
FIG. 7 is a block diagram depicting the serial interface circuit according to another embodiment of the present invention.

FIG. 7 is a block diagram depicting another embodiment of the power save mode control of the present invention, and shows only the physical layer 60 and the link layer 66 of the SATA core logic circuit 52 in FIG. 2. The other configuration, which is the same, will be omitted.

As FIG. 7 shows, in the serial type interface using a frame type protocol, the hardware-based clock stop circuits 110-116 are disposed. In other words, firmware only instructs to enter the power mode to the power mode register 72 disposed in the application (command) layer 70.

In the link digital circuit 66, on the other hand, the frame transmission/reception circuit 120 and the frame receive state machine circuit 110 are disposed. The frame receive state machine circuit 110 monitors the frame receive status of the frame transmission/reception circuit 120.

The gate 116 is also disposed between the power mode register 72 and the clock control circuit 100. The frame receive state machine circuit 110 enables a stop to the gate 116 when a frame is not being received. Therefore when the firmware instructs power save mode, the frame receive state machine circuit 110, that is hardware, confirms the frame receiving status thereafter, and if entering the power save mode is possible, the frame receive state machine circuit 110 opens the gate 116, performs the entry operation, and if this is not possible, this is notified to the firmware.

The time required for this is negligibly short (100 ns or less). In other words, the power save mode entry instruction passes through the gate 116, then sets the clock gate 92 to be the clock stop status via the two synchronization flip-flops 104 and 102 disposed in the clock control circuit 100.

Also this clock stop signal is sent to the physical analog circuit 62 and the clock gate 90, and cuts power of the analog circuit 62 and stops the supply of clocks to the physical digital circuit 64.

The frame receive state machine circuit 110 recognizes clock stop completion by this clock stop signal via the two synchronization flip-flops 112 and 114 disposed in the link digital circuit 66.

The power save entry control, after such status confirmation, has been conventionally performed completely by firmware, so as to avoid an unexpected stop of the clock when receiving frames, so the firmware requires a complicated procedure for confirming the hardware status, which takes an enormous amount of time.

In the present embodiment, an unexpected clock stoppage during frame reception is avoided, and the time up to the stop of the clock is decreased by disposing the clock stop circuit.

Also a hardware-based clock return circuit 130 for the starting signal COMWAKE from the remote (host) side is disposed in the link digital circuit 66. In other words, the clock return circuit 130 sends a receive request return signal from the starting signal COMWAKE to the power mode register 72 synchronizing with the clock, and changes the content of the register 72 from entering to returning.

This return instruction passes through the gate 116, then sets the clock gate 92 to be the clock supply status via the two synchronization flip-flops 104 and 102 disposed in the clock control circuit 100.

This clock return signal is sent to the physical analog circuit 62 and clock gate 90 to return power supply to the analog circuit 62, and supply clocks to the physical digital circuit 64.

The frame receive state machine circuit 110 recognizes completion of clock return by this clock return signal via the two synchronization flip-flops 112 and 114 disposed in the link digital circuit 66.

In the prior art, this control has been performed completely by firmware, but firmware processing during power save takes an enormous amount of time if complicated control is involved since CPU performance is restricted.

In this way, by performing an operation the opposite of that for entering power save mode by hardware when frame transmission is requested from the remote (host) side, the time required for a return from power save mode becomes negligibly short, and the frame receive operation also becomes short.

Other Embodiments

In the above embodiments, a clock is stopped in the same way for both partial and slumber, but clock stop control may be performed only for partial mode, since the return time is relatively long in slumber mode, and the clock source may be stopped in slumber mode, just like the prior art.

The serial interface was described using SATA, but the present invention can also be applied to another serial interface, such as USB. The device was described using a hard disk drive, but the present invention can also be applied to other peripheral devices, such as an optical disk drive and a printer.

The present invention was described using the embodiments, but the present invention can be modified in various ways, which shall not be excluded from the scope of the present invention.

In the power save mode of the present invention, not only decreasing the current of the analog portion of the interface circuit but also the clock operation in the digital portion alone is stopped while maintaining operation of the clock source in the digital portion, so a quick shift to and return from the power save mode by stopping/restarting the clock is implemented, which further decreases power consumption, and in particular this effect is noteworthy when applied to mobile equipment, which requires low power consumption and improved performance.

What is claimed is:

1. A serial type interface circuit for transmitting/receiving data via a serial interface, comprising:
   an analog circuit connected to a serial line for analog-processing transmission/reception signals of the serial line;
   a digital circuit connected to said analog circuit for digital-processing the received signals from said analog circuit and the transmission signals to said analog circuit according to clocks;
   a clock generation circuit for supplying said clocks to said digital circuit; and
   a gate circuit for supplying the clocks of said clock generation circuit to said digital circuit and stopping the supply of the clocks simultaneously with cut of the power of said analog circuit according to a power save instruction,
   wherein said analog circuit includes:
   a driver to said interface;
   a receiver from said interface;
   a detection circuit for detecting a burst signal of said interface; and
   a clock generation source for generating clocks synchronizing with the signals of said interface,
   and wherein said digital circuit returns said gate circuit to the clock supply status according to a frame transmission request that said detection circuit detected from the burst signal.

2. The serial type interface circuit according to claim 1, wherein said analog circuit constitutes a part of a physical layer, and
   said digital circuit further includes:
   a first digital circuit constituting the other part of said physical layer; and
   a second digital circuit constituting a link layer that performs link control.

3. The serial type interface circuit according to claim 2, wherein said first digital circuit operates with clocks from a first clock source of said analog circuit via a first gate circuit, and
   said second digital circuit operates with clocks from a second clock source via a second gate circuit, and controls said first and second gate circuits to be in clock supply stop status according to said power save instruction.

4. The serial type interface circuit according to claim 1, further comprising a clock stop circuit that monitors the reception status in said interface, and controls said gate circuit to be in clock supply stop status when frames are not being received from said interface, according to said power save instruction.

5. The serial type interface circuit according to claim 1, further comprising a clock return circuit that returns said gate circuit to a clock supply status according to a frame transmission request from said interface.

6. The serial type interface circuit according to claim 1, wherein said digital circuit cuts power of said analog circuit and controls said gate circuit to be in clock supply stop status according to the power save instruction received from said interface.

7. A power save method for an interface circuit for transmitting/receiving data via a serial interface, comprising the steps of:
   controlling a gate circuit that supplies and stops clocks of a clock generation circuit to a digital circuit to be in a clock supply stop status according to a power save instruction, in said interface circuit comprising an analog circuit connected to a serial line for analog-processing transmission/reception signals of the serial line, and said digital circuit connected to said analog circuit for digital-processing the received signals from said analog circuit and the transmission signals to said analog circuit according to clocks; and
   return controlling said gate circuit to be in a clock supply status according to a return instruction,
   wherein said return control step comprises a step of returning said gate circuit to the clock supply status according to a frame transmission request detected from a burst signal by a detection circuit of said analog circuit, said analog circuit comprising a driver to said interface, a receiver from said interface, said detection circuit for detecting a burst signal of said interface, and a clock generation source for generating clocks synchronizing with the signals of said interface.

8. The power save method for an interface circuit according to claim 7, further comprising a step of operating a first digital circuit constituting a part of a physical layer with clocks from a first clock source of an analog circuit constituting the other part of said physical layer via a first gate circuit, and operating a second digital circuit constituting a link layer with clocks of a second clock source via a second gate circuit,
   wherein said step of controlling to said supply stop status further comprises a step of controlling said first and second gate circuits to be in said clock supply stop status according to said power save instruction.

9. The power save method for an interface circuit according to claim 7, wherein said stop control step further comprises a step of monitoring the reception status in said interface by hardware, and controlling said gate circuit to be in said clock supply stop status when frames are not being received from said interface, according to said power save instruction.

10. The power save method for an interface circuit according to claim 7, wherein said return control step further comprises a step of returning said gate circuit to the clock supply status according to a frame transmission request from said interface.

11. The power save method for an interface circuit according to claim 7, wherein said stop control step comprises a step of cutting power of said analog circuit and controlling said gate circuit to be in said clock supply stop status according to a power save instruction received from said interface.

12. A serial interface device for transmitting/receiving data with a host via a serial interface, comprising:
   a serial interface circuit; and
   a processing circuit connected to said serial interface circuit for transmitting/receiving data with said host,
   wherein said serial interface circuit comprises:
   an analog circuit connected to a serial line for analog-processing transmission/reception signals of the serial line;
   a digital circuit connected to said analog circuit for digital-processing the received signals from said analog circuit and the transmission signals to said analog circuit according to clocks;
   a clock generation circuit for supplying said clocks to said digital circuit; and
   a gate circuit for supplying the clocks of said clock generation circuit to said digital circuit and stopping the supply of the clocks simultaneously with cut of the power of said analog circuit according to a power save instruction,
   and wherein said analog circuit includes:
   a driver to said interface;
   a receiver from said interface;
   a detection circuit for detecting a burst signal of said interface; and
   a clock generation source for generating clocks synchronizing with the signals of said interface,
   and wherein said digital circuit returns said gate circuit to the clock supply status according to a frame transmission request that said detection circuit detected from the burst signal.

13. The serial interface device according to claim 12, wherein said analog circuit constitutes a part of a physical layer, and
   said digital circuit comprises:
   a first digital circuit constituting the other part of said physical layer; and
   a second digital circuit constituting a link layer that performs link control.

14. The serial interface device according to claim 13, wherein said first digital circuit operates with clocks from a first clock source of said analog circuit via a first gate circuit, and
   said second digital circuit operates with clocks from a second clock source via a second gate circuit, and controls said first and second gate circuits to be in said clock supply stop status according to said power save instruction.

15. The serial interface device according to claim 12, further comprising a clock stop circuit that monitors the reception status in said interface, and controls said gate circuit to be in said clock supply stop status when frames are not being received from said interface, according to said power save instruction.

16. The serial interface device according to claim 12, further comprising a clock return circuit that returns said gate circuit to the clock supply status according to a frame transmission request from said interface.

17. The serial interface device according to claim 12, wherein said digital circuit cuts power of said analog circuit and controls said gate circuit to be in said clock supply stop status according to the power save instruction received from said interface.

* * * * *